United States Patent [19]

Crumal

[11] 3,813,945

[45] June 4, 1974

[54] APPARATUS FOR EXTRACTING A LIQUID SAMPLE AT VARIOUS DEPTHS OF A LIQUID STREAM

[75] Inventor: Jimmie Crumal, La Honda, Calif.

[73] Assignee: Nielsen Engineering & Research Inc., Mountain View, Calif.

[22] Filed: Nov. 19, 1971

[21] Appl. No.: 200,403

[52] U.S. Cl............................ 73/422 TC, 73/423 R
[51] Int. Cl. .............................................. G01n 1/14
[58] Field of Search .... 73/422 TC, 423 R; 318/482; 33/126.4 R, 126.4 A

[56] References Cited
UNITED STATES PATENTS

| | | | |
|---|---|---|---|
| 3,058,351 | 10/1962 | McFarland et al. | 73/423 R |
| 3,115,782 | 12/1963 | Echter | 73/422 TC |
| 3,200,649 | 8/1965 | Peterson | 73/422 TC |
| 3,469,453 | 9/1969 | Nelson | 73/422 TC |
| 3,707,000 | 12/1972 | Anderson | 73/304 R |

FOREIGN PATENTS OR APPLICATIONS 6,804,387   9/1969   Netherlands.................... 73/422 R Primary Examiner—Richard C. Queisser
Assistant Examiner—Daniel M. Yasich
Attorney, Agent, or Firm—Limbach, Limbach & Sutton

[57] ABSTRACT

A hollow elongated tube having an opening near its lowest end descends into a stream. A plunger within the tube normally positioned below the opening rises upward within the tube after the tube reaches the bottom of the stream to force a liquid sample out the top of the tube. A second plunger may be employed within the tube normally positioned above the opening to act as a pump plunger descends through the stream of liquid. The pump plunger travel may be controlled as a function of height of the opening of the tube within the stream in order to obtain a liquid sample that contains various constituents in the same proportion as the liquid stream.

13 Claims, 9 Drawing Figures

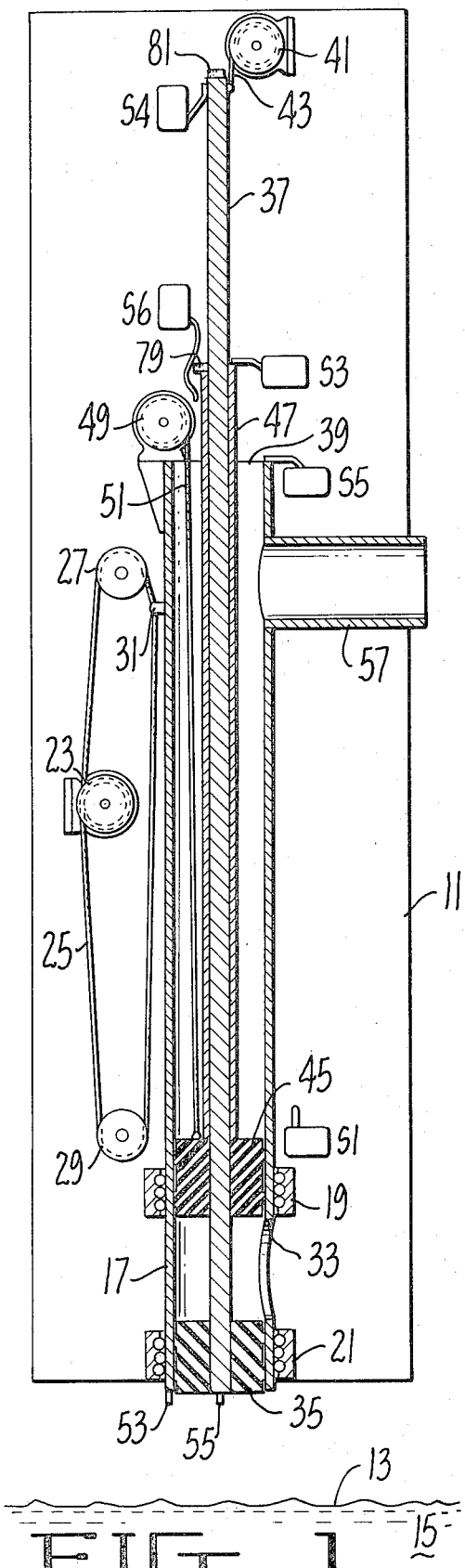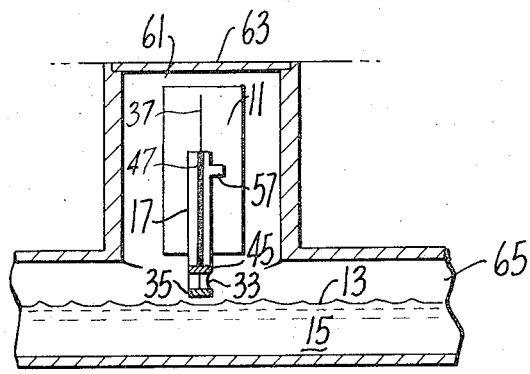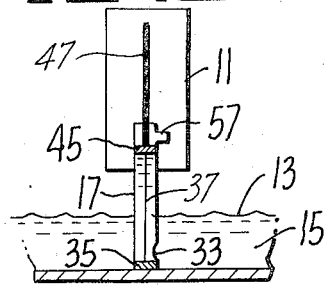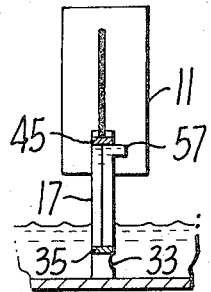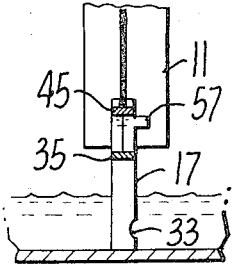
INVENTOR.
JIMMIE CRUMAL
BY Limbach, Limbach & Sutton
ATTORNEYS

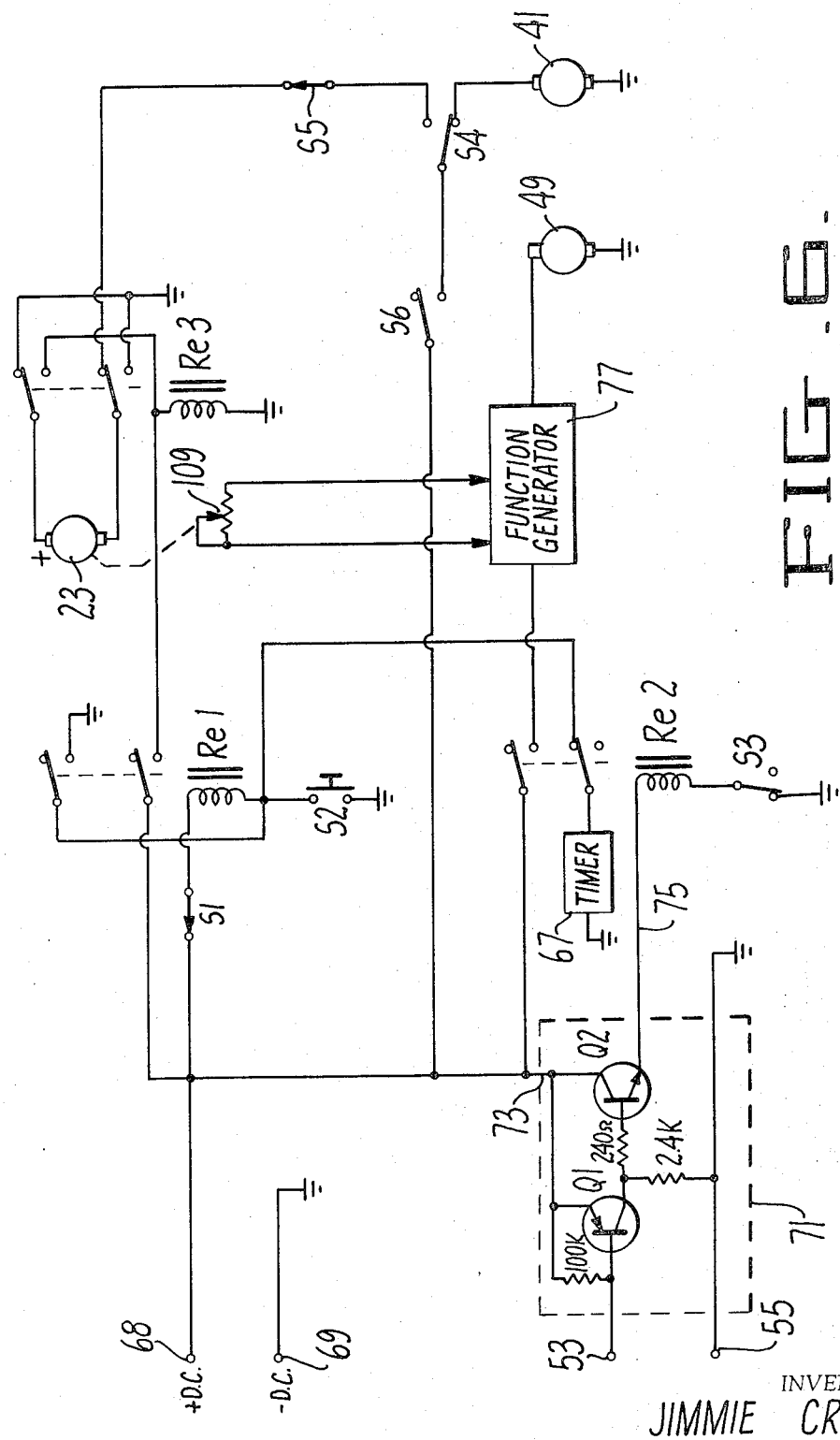

INVENTOR.
JIMMIE CRUMAL
BY
Limbach, Limbach & Sutton
ATTORNEYS

APPARATUS FOR EXTRACTING A LIQUID SAMPLE AT VARIOUS DEPTHS OF A LIQUID STREAM

BACKGROUND OF THE INVENTION

This invention relates generally to a liquid stream sampling apparatus, particularly to such apparatus for sampling the liquid flow in a storm, sanitary, or combined sewer in order to determine the pollutant content thereof.

Knowledge of the quality and quantity of flow in sewers is becoming increasingly important. In storm and combined sewers, it is desirable to treat storm waters to reduce the pollutant load that is carried thereby into a river or other receiving body of water. In order to provide the most efficient and economical treatment of storm waters, it is necessary to know what the pollutants in the storm water are and how the pollutant load varies with time during a storm.

In sanitary and combined sewers, it is becoming more common to require industrial and commercial firms to monitor their effluent dumped into the municipal sewer systems in order that the firms can be billed on the basis of their pollutant load injected into the sewers to help support the cost of sewer system operation. In order for firms to monitor and establish their pollutant loads for billing purposes, it is necessary to have representative samples of the flow in the sewer.

Further, in waste water treatment plants, it is highly desirable to obtain samples of the incoming sewer water over the depth of the flow to insure that any local concentrations of pollutants are sampled and that accurate loads of all pollutant levels are measured.

Floatable constituents of the sewer water, such as oil, grease, and wood materials, travel along the surface of the sewer water. Throughout the depth of the water will be suspended solids or dissolved materials such as chemicals, pesticides, nitrogen and phosphate nutrients, dirt, rags, and paper. Near and at the bottom of the sewer water will be the heavier material which may be in suspension or may be rolling or bumping along the bottom of the sewer. If the sewer water flow is very turbulent and well mixed, the concentration of each of the various pollutant constituents carried thereby will tend to be uniform as a function of the stream depth. However, the degree of mixing of the various pollutants probably changes in a given sewer with the flow velocity. The degree of mixing also varies between sewers and is dependent upon the sewer's physical characteristics which promote turbulence such as bends, enlargements, and spillways.

Existing sampling techniques and apparatus primarily extract a sample at only one point in a cross-section of a storm sewer water flow. This has the disadvantage that the sample does not contain all the pollutants that exist in the water flow unless the flow happens to be homogeneous and well mixed. Therefore, it is a primary object of the present invention to obtain portions of a sample from all levels of liquid flow.

It is a further object of the present invention to obtain a sample from a liquid stream that contains pollutant constituents in the same proportion as carried by the total mass of liquid flow. A co-pending patent application of Richard G. Schwind entitled, "Method and Apparatus for Obtaining Mass Average Samples from a Liquid Stream", Ser. No. 200,750, filed Nov. 22, 1971, now U.S. Pat. No. 3,724,276 issued Apr. 3, 1973 describes a technique wherein such a mass proportional liquid sample may be extracted from a liquid stream. According to that technique, varying sample quantities are obtained at different elevations within the liquid stream at a single location along the length of the stream. A sample is obtained by extracting a portion thereof at each level within the liquid stream according to a distribution that is directly proportional to a distribution across the depth of the stream of the mass flow of liquid per unit time. More liquid mass flows past a given point of the stream per unit time, for instance, at the middle of the stream than at the bottom of the stream. Therefore, a larger portion of a sample taken from the stream should be taken from its middle than at the bottom of the stream in order to obtain a sample having various constituents in the same relative proportions that exist in the stream. This mass average sampling technique of Richard G. Schwind is described in more detail hereinafter.

It is an additional object of the present invention to provide an apparatus for obtaining a mass proportional sample that is simple in construction and which does not accumulate debris which may be flowing in the liquid stream to be sampled.

SUMMARY OF THE INVENTION

The sampling apparatus of the present invention includes an elongated hollow tube positioned vertically above the liquid stream to be sampled, such as above a stream of sewer water. The tube is lowered in a direction along its length into the stream only when a sample is to be taken. There is provided an opening on the side of the tube adjacent its lower end for receiving liquid from the stream. A plunger is contained within the tube and is normally frictionally engaged therewith at its lower end below the opening. When a sample is to be taken, the tube with the plunger therein is lowered into the liquid stream, traversing from the top to the bottom of the stream. Some liquid from all levels then flows into the interior portion of the tube through its lower side opening. When the tube reaches the bottom of the stream, its downward motion is stopped and the plunger is then drawn upward to force a column of sample liquid collected within the tube out of a spout provided near the upper end of the tube. The sample is collected in a container as it is discharged from the spout for later analysis. The tube is then withdrawn from the stream and its plunger is returned to its rest position at the lower end of the tube ready for the next sample to be taken.

It is preferable to be able to extract a sample having mass proportions of each stream constituent that are substantially the same as the constituent proportions of the stream at the time that the sample is taken. Therefore, the sampling apparatus of the present invention preferably includes means for controllably drawing liquid into the tube at its bottom opening as the tube translates across the depth of the liquid stream. The amount of liquid drawn into the tube as a function of stream depth is proportional to the mass flow of the stream at various elevations thereof. This is accomplished by use of a second plunger within the elongated tube that is normally positioned near the lower end of the tube but immediately above the side liquid opening. As the tube is lowered into the liquid stream, the second plunger is drawn upward inside the tube at a rate of speed relative thereto that is a function of the height of the side opening of the tube within the liquid stream.

The liquid sampling apparatus of this invention is described in a preferred embodiment hereinafter with respect to the accompanying drawings.

BRIEF DESCRIPTION OF THE DRAWINGS

FIG. 1 is a partially broken view of a sampling apparatus according to the present invention;

FIGS. 2, 3, 4 and 5 schematically represent the sampling apparatus of FIG. 1 in various stages of collecting a liquid stream sample;

FIG. 6 is a schematic diagram of an electrical control system for the apparatus of FIG. 1;

DESCRIPTION OF THE PREFERRED EMBODIMENT

Figure 7:
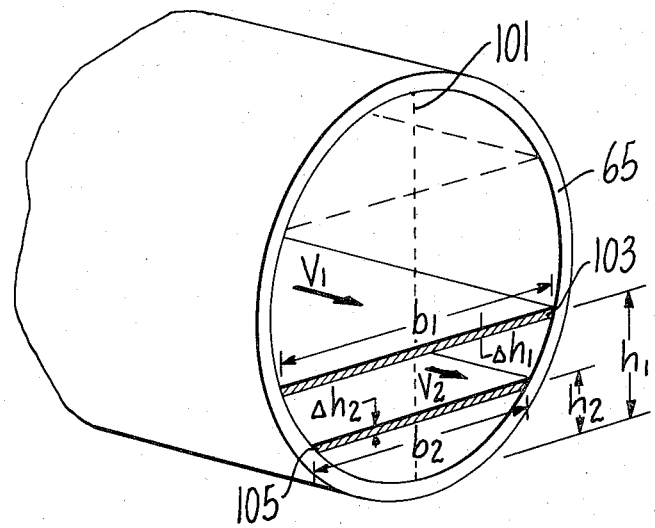
FIG. 7 is a schematic representation of fluid flow in a round storm sewer.

Referring to FIG. 1, a preferred form of a sewer sampler according to the present invention is illustrated with all of the parts thereof mounted on a rigid frame 11. The frame 11 may be, for instance, a rigid wood sheet having the rectangular shape as shown. The sampling apparatus is shown with the long direction of the frame 11 oriented vertically above a surface 13 of a flowing liquid stream 15.

A hollow elongated tube 17 having a circular cross-section both inside and out is mounted vertically on the frame 11 by means of a pair of linear bearings 19 and 21, or some other convenient mechanism. The bearings 19 and 21 are rigidly attached to the frame 11 in a manner to permit free and easy vertical movement of the tube 17 in a direction along its length. It is the tube 17 that is caused to descend into the liquid stream 15 for taking a sample thereof while the frame 11 is held above the liquid stream and serves to support the various mechanical elements. Although the tube 17 could be manually operated, it and other operating elements within the tube 17 are given motion by electric motors which are automatically controlled. An electric motor 23 is rigidly attached to the frame 11 and drives an endless cable 25. The endless cable 25 is supported by a pair of pulleys 27 and 29 that are rotatably attached to the frame 11. The endless cable 25 is attached at a point 31 to the tube 17. The motor 23 is preferably a direct current type so that the tube 17 may be both raised and lowered by merely reversing the polarity of the electric supply voltage to the motor 23.

An opening 33 is provided near the lower end of the tube 17 for a liquid sample to flow therethrough into the tube. A lower plunger 35 is positioned within the tube 17 in a manner to frictionally engage the inner side walls of the tube 17. This frictional engagement is caused to be at a level, of course, that permits movement of the lower plunger 35 relative to the tube 17 but it is great enough so that the lower plunger 35 travels with the tube 17 absent any special forces being applied to the plunger 35 alone. The plunger 35 is shown in FIG. 1 in its rest position at the lower end of the tube 17 immediately below the tube side opening 33.

An appropriate material for the plunger 35 is rubber. The plunger 35 is rigidly attached to the lower end of a rod 37. The rod 37 is concentrically positioned within the tube 17 and extends along the length of the tube out through a top opening 39 of the tube 17. A motor 41 is attached to the frame 11. A cable 43 is wound around a drum and clutch assembly as part of the motor 41. The cable 43 has one end thereof attached to the rod 37. The clutch that is part of the motor assembly 41 permits the rod 37 to descend downward as the tube 17 is driven by the motor 23 downward into the liquid stream 15. The cable 43 merely unwinds from its drum without an operable connection with the motor 41. However, the clutch permits the motor 41 to pull the rod 37, and thus the plunger 35, upward within the tube 17 to remove a collected sample therefrom, as is explained in more detail hereinafter.

An upper plunger 45 within the tube 17 acts as a pump piston for drawing liquid into the tube 17 through its side opening 33. As with the lower plunger 35, the upper plunger 45 frictionally engages the inner side walls of the tube 17 in a liquid tight manner. The tube 17 carries the upper plunger 45 as the tube is lowered into the liquid stream 15. The frictional engagement between the plunger 45 and the tube 17 is not so great, however, as to prohibit movement of the plunger 45 with respect to the tube 17 to perform a pumping function.

The upper plunger 45 is attached to the lower end of a hollow support tube 47. The support tube 47 is concentric with the tube 17 and surrounds the rod 37. The plunger 45 is pulled upward with respect to the tube 17 by a motor and clutch assembly 49 that is supported on the upper end of the tube 17. A cable 51 extends down into the tube 17 and is rigidly attached to the support tube 47 in the vicinity of the plunger 45. A clutch, as part of the motor and clutch assembly 49, permits the plunger 45 to descend downward relative to the tube 17. When electric energy is applied to the motor 49, the plunger 45 is pulled upward with respect to the tube 17 by the cable 51. The motor 49 is preferably a direct current electric driven type which permits a variation of speed.

Operation of the sampler shown in FIG. 1 is, briefly, that the tube 17, along with the plungers 35 and 45 frictionally engaged therewith, is lowered into the liquid stream 15 by energizing the tube driving motor 23. As soon as the lower end of the tube 17 reaches the surface 13 of the liquid stream 15, an electrical connection is effected between a pair of exposed terminals 53 and 55. In response to this change of conductive state between the terminals 53 and 55, the motor 49 is energized which causes the upper plunger 45 to rise with respect to the tube 17. The upper plunger 45 thereby controllably takes a quantity of liquid sample into the tube 17 through its lower inlet 33. When the tube 17 reaches the bottom of the liquid stream 15, an electric switch S1 is activated by contact with a spout 57 that is attached to a side of the tube 17 near its upper end. As the plunger 45 rises above the point of attachment of the spout 57 to the tube 17, the lower plunger 35 is given vertical motion with respect to the now stationary tube 17 by support tube 47 contacting switch 56 to energize the motor 41. As the plunger 35 is pulled upward, the liquid sample accumulated within the tube 17 is forced out through the spout 57.

All of the various operations of the elements of the sample shown in FIG. 1 are preferably controlled automatically by an electrical control system such as that shown in FIG. 6, to be described hereinafter. The switch S1 is rigidly attached to the frame 11 in its position shown in FIG. 1. Additional switches S3, S4, S5, and S6 are also rigidly attached to the frame 11 for sensing certain positions of the various elements of the sampler. The switches form informational inputs to an electrical control circuitry.

The operation of the sampler of FIG. 1 is illustrated at different times of a cycle for extracting a single sample in FIGS. 2-5. FIG. 2 shows the sampler frame 11 mounted in one convenient way, in a manhole 61 under a manhole cover 63. A sewer 65 contains the liquid stream 15 from which a sample is to be extracted at periodic intervals. Referring to the control system of FIG. 6, which may most conveniently be attached to the backside of the frame 11, the sampler is actuated either by manually depressing a pushbutton S2 or it is automatically begun by a pre-programmed timer 67. When either the timer or the manual switch S2 is activated, a relay Re1 is energized by connection across the power input terminals 68 and 69 which are supplied with a direct current voltage source. Each of the switches and relays shown in FIG. 6 is in its unactuated or rest position. When the relay Re1 is energized, the circuits are switched so that the relay coil is locked across the voltage supply terminals 68 and 69 until the switch S1 is activated later in the sampler cycle. Also, power is applied to the relay Re3 as a result of the relay Re1 being energized. This places the tube moving motor 23 across the power input and thus causes the tube 17 of FIG. 1 to begin to descend toward the surface 13 of the liquid stream 15.

The first point that the control circuit of FIG. 6 is given an electrical signal changing its operation is when the tube 17 has been lowered to a position where its lowered end first touches the surface 13 of the lquid stream 15, a position schematically shown in FIG. 2. In this position, an electrical conductive path is formed through the liquid between the level sensors 53 and 55 (FIGS. 1 and 6). Referring to FIG. 6, this conductive path keys a semi-conductor amplifier (or switch means) 71 which is connected by a line 73 to the positive power supply terminal 68. A line 75 at the output of the amplifier 71 is connected with a relay Re2. The amplifier 71 includes transistors $Q_1$ and $Q_2$ which may be type 2N2905 and 2N3442, respectively. The transistor $Q_2$ is driven as a switch which controls application of power from the +d.c. voltage line 73 to the output line 75.

A sufficient current is generated in the output line 75 by the amplifier 71 when the terminals 53 and 55 are submersed in the sewer water to switch the relay Re2 from its rest position shown. When switched, the timer 67 is disconnected so that it may not call for the start of another cycle until the present cycle is completed.

Additionally, a switching of the relay Re2 connects the motor 49 to the power input terminals 67 and 69 in series with a function generator 77. The function generator 77 controls the speed of the motor 49, and thus the speed of the plunger 45 with respect to the tube 17, in a manner described in detail hereinafter. The function generator 77 is not necessary if it is not desired to obtain a mass proportional sample of the stream.

Therefore, as the tube 17 descends to strike the surface 13 of the liquid stream 15, the motor 49 is energized and the upper plunger 45 begins to travel upward inside the tube 17 at the same time that tube 17 continues its downward path into the liquid stream 15. As shown in FIG. 3, the upper plunger 45 has been drawn to a position immediately below the spout 57 at the same time that the lower end of the tube 17 strikes the bottom of the stream 15. This synchronization is accomplished in part by the function generator 77 which controls the speed at which the upper plunger 45 is moved within the tube 17. When the various elements reach the positions shown in FIG. 3, the state of certain of switches of the sampler are changed, thereby to initiate various control actions by the circuit of FIG. 6. The switch S1 is changed in state by the lower portion of the spout 57 contacting the switch S1 as the tube 17 is fully extended downward. Referring to the circuit diagram of FIG. 6, it will be seen that when the switch S1 is thrown, the relay Re1 is de-energized and returns to its rest state as shown. When this occurs, energy is also removed from the relay Re3 which has the effect of turning off the tube driving motor 23.

When the sampler elements reach the positions shown in FIG. 3, a switch S6 is activated by the supporting tube 47 of the plunger 45. When the switch S6 is thrown, as can be seen from FIG. 6, the lower plunger moving motor 41 is connected with the power input terminals 67 and 69 and thus the lower plunger 35 begins to ascend. For the next period of time, both the lower plunger 35 and the upper plunger 45 are moving upward in the tube 17, closing off the lower opening 33 and the upper outlet spout 57 simultaneously. Continued motion of the plunger 35 and 45 results in their relative positions reaching that shown in FIG. 4. In the position of FIG. 4, the upper plunger 45 has been returned to its rest position against a mechanical stop 79 that is attached to the frame 11 (FIG. 1). Simultaneously with this, the switch S3 is thrown from its rest condition shown in FIG. 6, thereby to de-energize the relay Re2. The motor 49 is thus de-energized and the upward pull on the upper plunger 45 is stopped.

The upper plunger 45 is stopped at a position immediately above the outlet spout 57 of the tube 17. The lower plunger 35 continues to move upward under the influence of the motor 41 until it reaches the rest position shown in FIG. 1 wherein the rod 37 strikes a stop 81 that is rigidly fixed to the frame 11 (FIG. 1). At this position, the switch S4 is caused to change its state by contact with the rod 37 which turns off the motor 41 (FIG. 6). This is the state of the various elements as shown in FIG. 5 wherein a complete sample has been discharged through the spout 57 into an appropriate container.

The lower plunger 35 is preferably stopped at a position a few inches below the lower edge of the spout 57. This leaves some liquid within the tube 17 above the lower plunger 35. This remaining liquid helps purge the system as the tube 17 is drawn back to its rest position.

Simultaneously with the lower plunger 35 stopping its motion by contacting the switch S4, the switch S4 connects the tube motor 23 with a polarity across the power input terminals 67 and 69 that is reversed from its earlier power connection. This causes the motor 23 to reverse its direction from that in the first part of the sampling cycle and pull the tube upward into its retracted position on the frame 11. As this occurs, the lower plunger 35 and the upper plunger 45 do not move with respect to the frame 11 but rather are merely urged upward against their mechanical stops 81 and 79, respectively. The tube 17 is pulled upward over the plungers until it reaches the rest position shown in FIG. 1. In this position, the switch S5 is thrown from the position shown in FIG. 6 which de-energizes the motor 23. The control circuit of FIG. 6 is then in a state to receive another signal to begin the automatic sampling cycle again.

The use of the upper plunger 45 as a controlled pump has the advantage that a specific amount of liquid may be drawn into the tube at various levels of the liquid stream. However, if this flexibility is not desired or needed, the upper plunger 45 need not be used, thus simplifying the sampler by eliminating its associated components. However, for the typical sewer sampling application, the upper plunger 45 is preferred and the motion controlling function generator 77 (FIG. 6) assures that the proper proportion of the sample being extracted is taken from each level of the liquid stream 15 in order to obtain a mass proportional sample.

Figure 8:
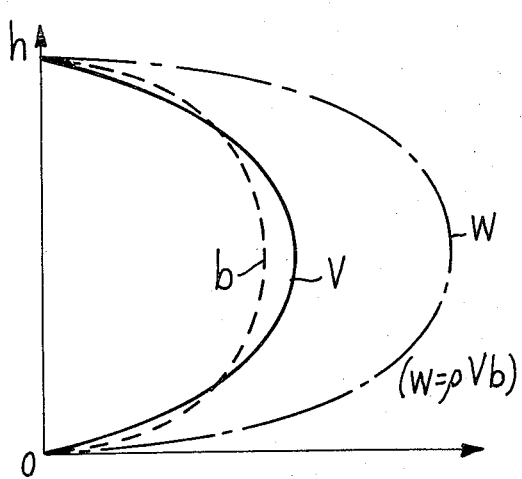
FIG. 8 is a plot of three variables across the height of the storm sewer of FIG. 7.

The desirability and goals of mass proportional sampling are illustrated in FIGS. 7 and 8. FIG. 7 schematically shows a cross-section of the sewer 65 having various quantities identified as an aid in analyzing sewer water flow through the sewer. A sample of sewer water is extracted along a substantially vertical line 101 that passes from the top to the bottom of the sewer pipe 65 and through its center. It will be understood that the techniques described herein are not limited to extracting samples from a sewer pipe but are also of advantage in extracting samples from nonhomogeneous liquid flows of other types. However, the mass-average sampling techniques described with respect to FIGS. 7 and 8 have particular advantage to sampling of sewer water flow.

Consider an incremental volume 103 of liquid flowing in the pipe 65 that has a height $\Delta h_1$ and a distance $h_1$ from the bottom of the storm sewer 65. The width of the incremental volume 103 is indicated by $b_1$ and its velocity along the length of the storm sewer is indicated by $V_1$. The mass of liquid which passes by a given point of the sewer pipe 65 in a given time in the incremental volume 103 is directly related to the width $b_1$ and the velocity $V_1$ of the incremental volume. A certain small percentage of this mass of sewer water is removed as part of a sample of the total flow in the sewer pipe 65.

The same small percentage of a mass of sewer water is removed from every other incremental volume within the sewer water flow. Consider a second increment 105 of the total flow. Its width $b_2$ is less than that ($b_1$) of the first increment 103. Also, the flow velocity $V_2$ is less than the flow velocity $V_1$ of the first increment 103 since the second increment 105 is more restrained by friction with the bottom of the sewer pipe 65. The same small percentage as was taken from the mass of sewer water flowing in the first increment 103 is taken from the mass of sewer water flowing in the second increment 105 as a second sample. These two samples are then mixed together to form a composite sample with constituent proportions being substantially the same as the constituent proportions of the combined flows of the increments 103 and 105.

The same procedure can be followed for the remaining incremental volumes of $\Delta h$ high across the stream of sewer water within the pipe 65. A liquid sample is continuously extracted by scanning the pump inlet 33 of FIG. 1 through the stream along the substantially vertical path 101. The technique described herein compensates for a varying velocity of liquid flowing at different levels in the sewer pipe 65 as well as compensating for variations in the width of the sewer pipe.

Referring to FIG. 8, characteristic curves of the sewer pipe 65 and a liquid flow therein are shown. Regardless of the height of liquid within the sewer pipe 65, a velocity profile of the sewer pipe 65 takes on a characteristic form such as that indicated by the curve V of FIG. 8. The curve V shows the relative velocities of fluid flowing at different elevations within the sewer pipe 65 along the vertical sample line 101. The various points on this curve are average velocities across the horizontal dimension. Velocity variations in the horizontal can generally be ignored since the constituent variation in a sewer water is vertical, generally being uniform in the horizontal direction. Such a curve can be constructed for a given location along a sewer pipe by emperical observation coupled with theoretical calculation.

The width of the sewer pipe 65 as a function of its height $h$ is shown by the dotted curve $b$. Of course, other shaped dewer pipes will have a different characteristic curve. For instance, a square sewer pipe should have a step function type of curve $b$ wherein the width is uniform from the bottom to the top.

A product of the velocity profile curve V and the width curve $b$, when multiplied by the average density $\rho$ of the sewer water, gives a characteristic mass flow distribution stream passing through the pipe 65 per unit time as a function of height $h$ within the stream. In order to obtain a mass average sample according to the techniques of the present invention, the mass of the sample extracted as a function of the height $h$ of the sewer pipe 65 substantially conforms to the total mass flow $w$. That is, the relative proportions of a sample that is withdrawn from the liquid flow within the sewer pipe 65 at various elevations therein along the vertical line 101 follow the shape of the mass flow curve $w$ of FIG. 8. At a height $h$ where the magnitude of $w$ is low, such as near the bottom of the pipe 65, the portion of a sample extracted at that level is low. However, where the magnitude of the curve $w$ of FIG. 8 is high, such as near the middle of the pipe 65, the proportion of liquid sample withdrawn at that height $h$ is high.

This averaging technique may be carried out by the sampling apparatus described with respect to FIGS. 1–6 by causing the speed of the upper plunger 45 with respect to the tube 17 as the tube is descending into the stream to conform with the curve $w$ of FIG. 8. That is, at the top and the bottom of a sewer, the upper plunger 45 is travelling at a slow rate of speed with respect to the tube 17, while near the middle of the sewer where the flow velocity is the greatest, the plunger 45 travels at a higher rate of speed. In order to accomplish this speed control of the upper plunger 45, when desired, the upper plunger motor 49 is chosen to be of a direct current type so that its speed may be controlled. The function generator 77 of FIG. 6 is then made part of the voltage supply circuit to the motor 49 for controlling its speed as a function of the position of the tube inlet 33 within the stream 15.

Figure 9:
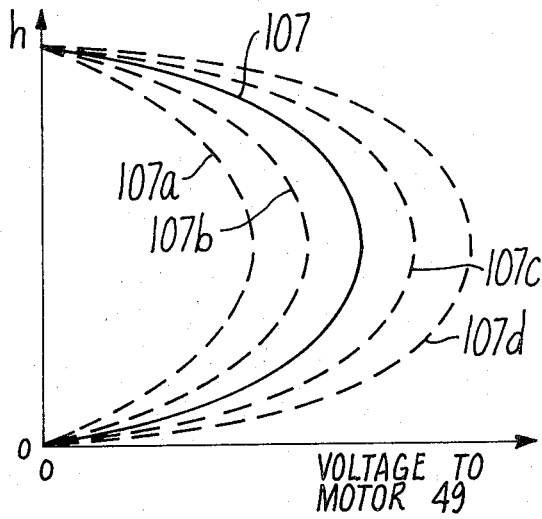
FIG. 9 is a family of curves that illustrates the operation of the function generator of FIG. 6.

The function generator 77 of FIG. 6 can be of any commonly used type. A characteristic curve of the function generator is indicated in FIG. 9 wherein the curve 107 shows the voltage applied to the motor 49 as a function of height of the tube inlet 33 within the sewer. The height information is supplied the function generator through some convenient means such as a potentiometer 109 (FIG. 6) which is mechanically driven from the shaft of the tube motor 23. Therefore, as the tube is lowered into the water stream 15, the varying voltage resultantly developed at the potentiometer 109 controls the voltage applied to the upper plunger motor 49 according to a predetermined function 107 (FIG. 9) by the function generator 77 of FIG. 6. The characteristic voltage curve 107 which drives the motor 49 approximates in shape the desired speed function $w$ (FIG. 8) of the upper plunger 45.

Since it is desired that the plunger 45 be drawn through its complete stroke length up to the stop 81 on the frame 11 (FIG. 1), the function generator 77 is also desirably programmed with a family of curves such as 107a, 107b, 107c, and 107d (FIG. 9) as well as the basic curve 107. The function generator 77 is caused to control the motor 49 according to one of the family of curve 107 of FIG. 9 depending on how high the surface 13 of the sewer is when the sample is taken. Since the function generator 77 is first energized when the tube 17 first strikes the sewer water surface 13, the voltage output of the potentiometer 109 at that position determines which of the family of curves 107 is to be used in controlling the upper plunger motor 49 in order that the plunger 45 is drawn through its complete stroke length in the same time that it takes for the tube 17 to descend to the bottom of the liquid stream being sampled. The tube 17 travels at a uniform speed downward into the liquid stream 15.

The details of a preferred embodiment of the sampling apparatus according to the present invention have been described, but it will be understood that the present invention comprehends all variations thereof within the scope of the appended claims.

What is claimed is:

1. Apparatus for taking a sample from a liquid stream, comprising:
   a rigid mounting frame,
   an elongated hollow tube attached to said frame in a manner to be slidable with respect thereto in a direction along the length of the tube from a rest position to an extended position away from said frame, whereby said frame may be oriented above a stream from which a sample is to be taken and the tube is oriented vertically for extending from its rest position above the stream to its extended position through the stream for taking a sample therefrom,
   an inlet opening on a side of the tube near its lower end for permitting sample liquid to flow into and be collected within said tube as the tube descends into a liquid stream,
   a discharge opening on said tube near its upper end for removing a collected liquid sample therefrom,
   a plunger within said tube normally and sealably held by the tube at its bottom below said inlet opening,
   means on said frame for controllably moving said tube in a direction along its length from its rest position to its extended position,
   means on said frame for controllably advancing the plunger along the hollow tube while the tube is in its extended position, thereby to discharge said collected liquid sample from within the tube through said discharge opening near the top of the tube,
   means for sensing when the tube moving means has advanced the tube to its said extended position,
   control means responsive to said tube extended position sensing means for stopping said tube moving means when the tube reaches its said extended position, and
   control means for beginning to operate said plunger advancing means when the tube reaches its said extended position.

2. Apparatus according to claim 1 which additionally comprises:
   means for sensing when said plunger reaches the top of said hollow tube, and
   means responsive to said plunger sensing means for reversing the direction of motion of said tube moving means when said plunger reaches the top of said hollow tube, thereby to return said tube from its extended position on said frame to its rest position.

3. Apparatus according to claim 2 which additionally comprises means on said frame for returning the plunger to its normally held position adjacent the bottom end of said hollow tube during the time that the hollow tube is pulled from its extended position back to its rest position.

4. Apparatus according to claim 2 which additionally comprises:
   a second plunger within said tube normally and sealably held by the tube near its bottom above said inlet, and
   control means for advancing said second plunger along the tube as said tube inlet descends into the liquid stream, thereby to act as a pump for drawing sample liquid into the tube inlet.

5. Apparatus according to claim 4 which additionally comprises:
   means for sensing when the tube inlet first reaches a top surface of the liquid stream as the tube is being moved from its rest to its extended position, and
   control means responsive to the liquid surface sensing means for initiating operation of said second plunger advancing means.

6. Apparatus according to claim 5 wherein said second plunger advancing control means includes means for varying the speed of said second plunger relative to the tube according to a predetermined function of the position of said tube relative to the frame as said tube moves from its rest to its extended positions.

7. Apparatus according to claim 5 wherein said liquid surface sensing means includes a pair of electrical terminals spaced a finite distance apart and held adjacent the lower end of said tube, whereby an electrical circuit is completed between said electrical terminals when they become submersed in the liquid stream and an indication is thus obtained when the lower end of said tube becomes submersed in liquid.

8. Apparatus for taking a sample from a liquid stream, comprising:
   a rigid mounting frame, an elongated hollow tube attached to said frame in a manner to be slidable with respect thereto in a direction along the length of the tube from a rest position to an extended position away from said frame, whereby said frame may be oriented above a stream from which a sample is to be taken and the tube is oriented vertically for extending from its rest position above the stream to its extended position through the stream for taking a sample therefrom, an inlet opening on a side of the tube near its lower end for permitting sample liquid to flow into and be collected within said tube as the tube descends into a liquid stream, a discharge opening on said tube near its upper end for removing a collected liquid sample therefrom, a first plunger within said tube normally held by the tube at its bottom below said inlet opening, means on said frame for moving said tube in a direction along its length from its rest position to its extended position, means on said frame for advancing the first plunger along the hollow tube while the tube is in its extended position, thereby to discharge said collected liquid sample from within the tube through said discharge opening near the top of the tube, a second plunger within said tube normally held by the tube near its bottom above said inlet, and control means on said frame independent of said first plunger advancing means and selectively operable upon said tube contacting said liquid stream for advancing said second plunger along the tube simultaneously with movement of the tube through the liquid stream toward its extended position, thereby to act as a pump for drawing sample liquid into the tube inlet.

9. Apparatus according to claim 8 wherein said second plunger advancing means includes means for varying the speed of said second plunger relative to the tube according to a predetermined function of the position of said tube relative to the frame, said predetermined function being directly proportional to a product of liquid flow velocity and stream width as a function of height of a particular liquid stream conduit.

10. Apparatus for taking a sample from a liquid stream, comprising:

a rigid mounting frame, an elongated hollow tube attached to said frame in a manner to be slidable with respect thereto in a direction along the length of the tube from a rest position to an extended position away from said frame, whereby said frame may be oriented above a stream from which a sample is to be taken and the tube is oriented vertically for extending from its rest position above the stream to its extended position through the stream for taking a sample therefrom, an inlet opening on a side of the tube near its lower end for permitting sample liquid to flow into and be collected within said tube as the tube descends into a liquid stream, a discharge opening on said tube near its upper end for removing a collected liquid sample therefrom, a first plunger within said tube normally and sealably held by the tube at its bottom below said inlet opening, a second plunger within said tube normally and sealably held by the tube at its bottom end but above the inlet opening, first motor means mounted on said frame for translating said tube from its rest position to its extended position, thereby traversing the tube inlet opening through a liquid stream for extracting a sample therefrom, second motor means operably connected to said first plunger for raising the first plunger within said tube, third motor means operably connected to said second plunger for raising the second plunger within said tube, and a control system which includes,
means for sensing when the bottom end of said tube strikes an upper surface of the liquid stream from which a sample is to be extracted,
means responsive to the water level surface sensing means to begin operating said third motor means to raise the second plunger within the tube to a first position above said discharge opening near the upper end of said tube,
means sensing when the rising second plunger reaches a second position adjacent the lower edge of said discharge opening for initiating operation of said second motor means to raise the first plunger upward within the tube in order to force the sample therein out through said tube discharge opening, and
means for sensing when said first plunger is positioned within said tube adjacent the lower edge of said discharge opening to begin operating said first motor means in a reverse direction to raise said tube from its extended position back to its rest position on said frame.

11. Apparatus for taking a liquid sample, comprising:

a mounting frame, an elongated hollow sample tube attached to said frame in a manner to be slidable in a direction along the length of the tube with respect to said frame, an inlet opening on a side of the tube near its end that may be furthest removed from the frame, thereby permitting a liquid sample to flow therethrough into the tube, a discharge opening on the side of said tube near its other end that remains nearest said frame for removing the collected liquid from within the tube, a first plunger within said tube and attached by one end of a rod extending along the length of the tube and being concentric therewith, a second plunger within the tube and attached to one end of a second hollow tube that is positioned concentrically with said sample tube and surrounding the first plunger support rod, said second hollow tube being slidable with respect to said rod, and separate means for selectively providing relative motion between all of said sample tube, first plunger and second plunger elements for drawing liquid into said tube through its said inlet opening and discharging said liquid from the tube through its said discharge opening.

12. Apparatus for extracting a liquid sample from a liquid stream along a vertical line across a conduit in which said stream flows, comprising:
- an elongated hollow tube vertically oriented above the conduit for movement along said vertical line, said tube having an inlet opening at its bottom end for drawing said liquid sample therethrough,
- means for vertically translating said tube up and down in a direction along its length, thereby to traverse said conduit with said inlet opening along said vertical line,
- a plunger within said tube capable of moving vertically within the tube to draw controlled amounts of liquid from the stream within the conduit into the tube through its inlet opening, and
- control means operably connected to said plunger for moving the plunger upward within said tube while the tube inlet is moving downward through said stream, said control means including means for controlling the speed of said plunger relative to the tube according to a predetermined function of the height of the tube inlet within the conduit that is directly proportional to a product of liquid flow velocity and stream width as a function of height along said vertical line.

13. Apparatus for extracting a liquid sample from a liquid stream along a vertical line across a conduit in which said stream flows, comprising:
- an elongated hollow tube vertically oriented above the conduit for movement along said vertical line, said tube having an inlet opening at its bottom end for drawing said liquid sample therethrough,
- means for vertically translating said tube up and down in a direction along its length, thereby to traverse said conduit with said inlet opening along said vertical line,
- a first plunger normally and sealably held within said tube above its said inlet, said first plunger being capable of moving vertically within the tube to draw controlled amounts of liquid from the stream within the conduit into the tube through its inlet opening,
- control means responsive to movement of the tube inlet downward through the liquid stream for moving the first plunger upward within said tube at the same time the tube is lowered into said conduit along said vertical line,
- a second plunger normally and sealably held below the inlet opening of said tube, and
- control means independent of said first plunger moving means for moving the second plunger upward within the tube when the tube is substantially in its extended position in order to remove a liquid sample from the tube.

* * * * *